UNITED STATES PATENT OFFICE.

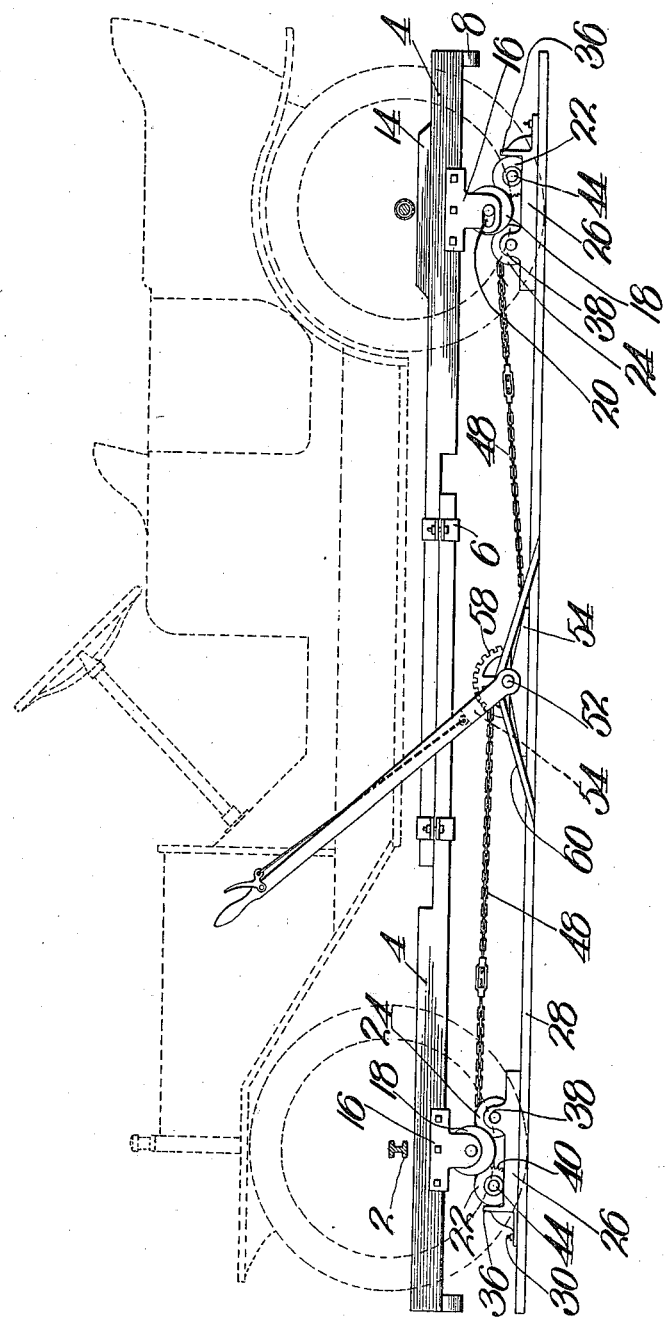

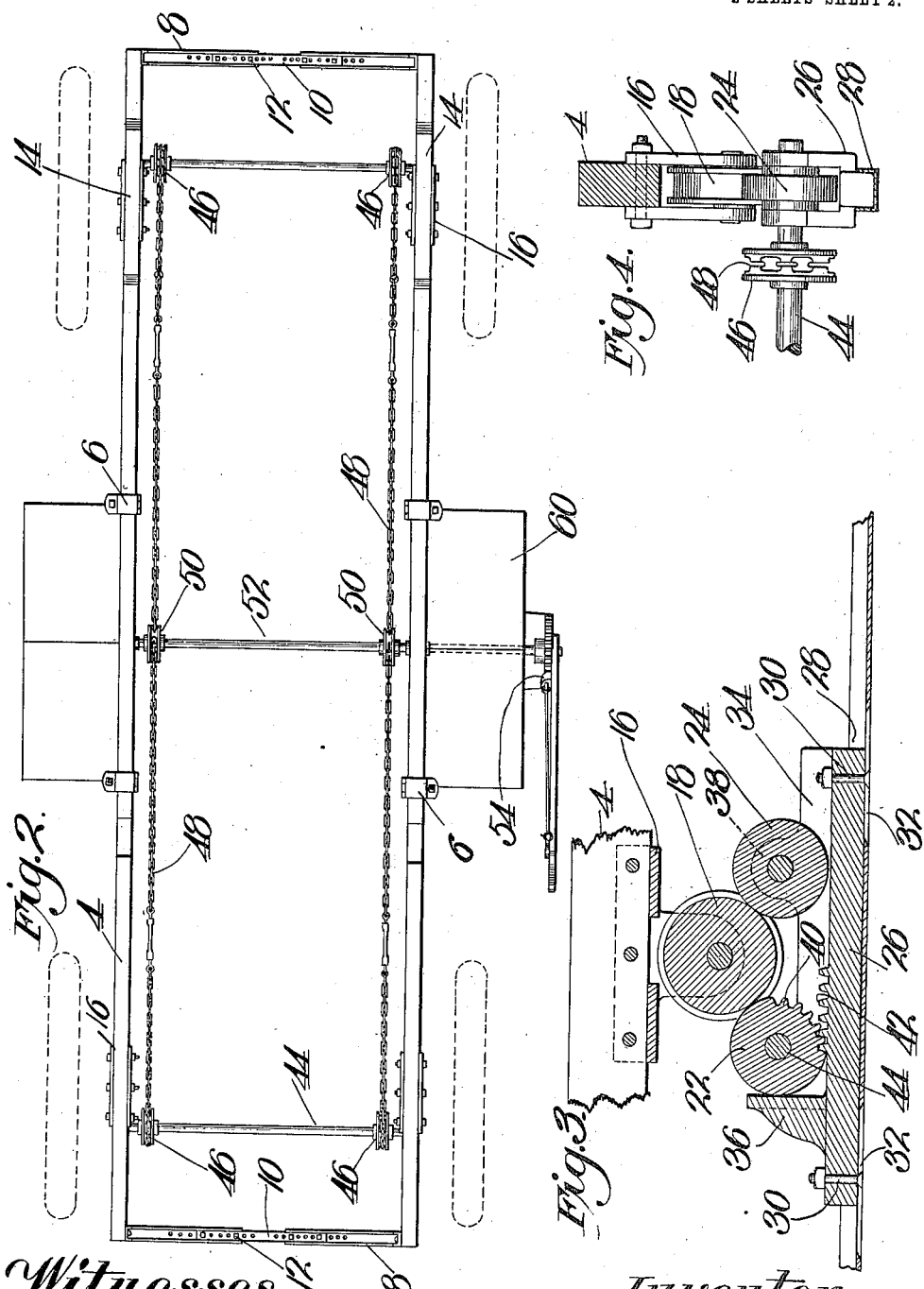

HARRY C. EDWARDS, OF KANSAS CITY, MISSOURI, ASSIGNOR OF ONE-HALF TO JOHN T. MEGREDY, OF KANSAS CITY, MISSOURI.

VEHICLE-JACK.

1,090,781.      Specification of Letters Patent.      Patented Mar. 17, 1914.

Application filed June 4, 1913. Serial No. 771,670.

*To all whom it may concern:*

Be it known that I, HARRY C. EDWARDS, a citizen of the United States, residing at Kansas City, in the county of Jackson and State of Missouri, have invented certain new and useful Improvements in Vehicle-Jacks, of which the following is a specification.

This invention relates to automobile jacks and my object is to provide an improved jack construction adapted to lift the vehicle bodily off the ground or floor of the garage, by a lifting force applied to the frame of the vehicle whereby the wheels may be relieved of the weight of the balance of the vehicle.

A further object is to produce a device of this character which will be of durable and simple construction and adjustable in its parts and which will operate readily and efficiently to perform the work for which it is designed.

With these objects in view the invention consists in certain novel and peculiar features of construction and organization as hereinafter described and claimed; and in order that it may be fully understood reference is to be had to the accompanying drawings, in which—

Figure 1, is a side elevation of the apparatus with an automobile shown in dotted lines in position ready to be jacked. Fig. 2, is a plan view of the apparatus. Fig. 3 is a sectional detail showing one of the sets of jacking elements before the same have been operated to jack the frame. Fig. 4, is an end elevation of the parts shown in Fig. 3, looking to the left in the latter figure.

Referring to the drawings, the frame of the jack or that part which engages the axles 2 of the vehicle when lifting the latter, comprises a pair of side bars 4, each made in sections secured together by clamps 6, and a pair of end bars 8 connecting the side bars and also made in sections secured together by plates 10, said sections and plates having a series of bolt openings, for the bolts 12 so that the width of the frame may be varied, the length of the frame being also adjustable by means of the clamps 6. The end bars are angular in form so as to locate their middle portions sufficiently lower than the balance of the frame, as shown in Fig. 1, to provide clearance for the differential housing of the rear axle, and blocks 14 are mounted on one end of the frame to accommodate the height of the rear axle.

Near each corner of the frame at approximately the points where the axle ends will be located when the vehicle comes to rest, a hanger 16 is secured in position to journal a flanged roller 18 beneath the frame. The hangers at one end of the frame are provided with elongated bearings 20 for the rollers (see Fig. 1) for a purpose hereinafter explained. With each roller 18 coöperates a pair of rollers 22 and 24 carried by the blocks 26 mounted in channel ways 28 underlying the side bars 4, said blocks being adjustably secured to the channel ways by means of bolts 30 which may be clamped in different positions in slots 32 provided in said ways. The upper portion of each block 26 is channeled as indicated at 34 and a stop face 36 is provided at the outer end of each channel.

The roller 24 is journaled about a fixed axis in lugs 38 toward the inner end of the block while the roller 22 is journaled about a movable axis so that the latter roller may be moved back and forth between the roller 24 and the stop face 36. A section of the periphery of the roller 22 is made up of teeth 40 to mesh with the series of teeth 42 formed in the bottom of the channel 34. When the jack is in lowered position, the roller 22 abuts against the stop face 36 and the space between the rollers 22—24 is such that the roller 18 will be supported materially above their line of centers. When the roller 22 is moved to the right in Fig. 3 to operate the jack, the teeth 40 and 42 engage to prevent slipping of the roller 22, and the roller 18 is thereby crowded up to a still higher position above the other rollers. Each roller 22 is fixed to one end of a shaft 44 extending from one side bar 4 to the other, and adjacent each of the rollers 22 is also fixed upon said shaft a pulley 46. Passing over each of the pulleys 46 and attached thereto is one end of a chain 48, the opposite ends of which chains are attached to pulleys 50 in alinement with pulleys 46 and fixed upon a shaft 52 journaled in blocks 54 beneath the middle portion of the frame. The chains from opposite ends of the frame are passed in opposite directions around the pulleys so that upon properly turning the shaft 52 the pulleys 46 will be rotated simultaneously toward the middle of the frame in order to turn the shaft 52 and thereby operate the jack to lift the car or vehicle on the frame. A lever 56 is keyed to one end of said shaft and a segmental rack 58 is provided for securing the lever in different positions in a well known manner.

It will be noted that the rollers 22 at the opposite ends of the frame are arranged to move toward each other, which results in correspondingly moving the rollers 18 toward each other as well as upwardly. For this reason the bearings 20 for the rollers 18 at one end of the frame are elongated as above stated to accommodate this relative movement of the rollers.

Inclined ways 60 are provided at the sides of the channel ways 28 to carry the wheels of the vehicle over the shaft 52.

It is thought that the operation of the device has been sufficiently indicated so that no further explanation thereof is necessary, and while I have illustrated one form which my invention is adapted to take, it will be understood that the same is susceptible of modifications in minor particulars and I reserve the right to such changes as fall within the scope of the appended claims.

I claim—

1. A vehicle jack comprising a frame for engaging the axles of the vehicle, said frame being provided with a series of rollers, a second series of rollers journaled beneath said first series of rollers in position to engage the same, and means to operate certain of said second series of rollers to crowd the first series of rollers into elevated position to lift the frame and thereby lift the weight of the vehicle off the wheels.

2. A vehicle jack comprising a frame for engaging the axles of the vehicle, said frame being provided with a series of rollers, a pair of rollers journaled beneath each of said first series of rollers in position to operatively engage the same, said pairs of rollers being journaled upon relatively movable axes, and means to produce relative approaching movement between the rollers of each pair in order to crowd the first series of rollers into elevated position to lift the frame and thereby lift the weight of the vehicle off the wheels.

3. A vehicle jack comprising a frame for engaging the axles of the vehicle, said frame being provided with a series of rollers, a pair of rollers journaled beneath each of said first series of rollers in position to operatively engage the same, one of the rollers of each pair being journaled about a fixed axis and the other being journaled about a movable axis and provided with teeth along a portion of its periphery, a fixed rack for engagement with each of said toothed rollers, and means to roll said toothed rollers along said racks toward their companion rollers in order to crowd the first series of rollers upward to lift the frame, and thereby remove the weight of the vehicle from the wheels.

4. A vehicle jack comprising a frame for engaging the axles of the vehicle, said frame being provided with a series of flanged rollers, a pair of rollers journaled beneath each of said flanged rollers in position to operatively engage the same, one of the rollers of each pair being journaled about a fixed axis and the other being fixed upon a shaft movable toward and from said fixed axis, the rollers on said shafts being each provided with teeth along a portion of its periphery, a fixed rack for engagement with each of said toothed rollers, pulleys fixed on said shafts adjacent each of the toothed rollers, chains operating over said pulleys, and common actuating means for causing said chains to rotate said pulley and cause each toothed roller to approach its companion roller in order to crowd said flanged rollers upward to lift the frame and thereby remove the weight of the vehicle from the wheels.

5. A vehicle jack comprising an oblong frame for engaging the axles of a vehicle, said frame being provided with a flanged roller depending therefrom near each corner thereof, a block located beneath each roller and supporting a pair of rollers in position to operatively engage the adjacent flanged roller, one of the rollers of each block being journaled upon a fixed axis and the other roller fixed upon a shaft movable toward and from said fixed axis, the rollers on said shafts being each provided with teeth along a portion of its periphery, each block being provided with a stop face limiting the movement of its toothed roller in one direction and with a rack for engaging the teeth of said toothed roller, pulleys fixed on said shafts adjacent each of the toothed rollers, a shaft mounted at the middle portion of the frame, and connections between said shaft and said pulleys for rotating the latter to cause said toothed rollers to roll along said racks toward their companion rollers and crowd said flanged rollers upward to lift the frame and thereby remove the weight of the vehicle from the wheels.

In testimony whereof, I affix my signature, in the presence of two witnesses.

HARRY C. EDWARDS.

Witnesses:
  CHAS. W. GERARD,
  G. Y. THORPE.

---

Copies of this patent may be obtained for five cents each, by addressing the "Commissioner of Patents, Washington, D. C."